United States Patent Office 2,938,780
Patented May 31, 1960

2,938,780
COMPOSITION FOR TURBOJET STARTER

Wayne A. Proell, Chicago, and Edwin F. Morello, Joliet, Ill., and William G. Stanley, Munster, and Robert W. Todd, Highland, Ind., assignors to Standard Oil Company, Chicago, Ill., a corporation of Indiana No Drawing. Filed Oct. 28, 1955, Ser. No. 543,594

8 Claims. (Cl. 52—.5)

This invention is concerned with the starting of turbojet engines. More particularly, the invention is concerned with an auxiliary starter utilizing a gas generating composition as the power source.

Turbojet engines require vast quantities of atmospheric air at relatively high pressures. These quantities of air at high pressure are obtained by diverting some of the energy produced in the combustion of the fuel to a turbine driven compressor. The turbine and the compressor in large engines amount to a considerable mass of metal. In order to start a turbojet engine it is necessary to bring the turbine and associated compressor to a certain minimum revolutions per minute prior to the introduction of the fuel to the combustors of the engine. Several techniques are now being used to spin the turbine to the required r.p.m. None of these techniques can be described as efficient or even relatively simple. The problem of the starting of the turbojet engine is an extremely difficult one primarily because of the mass of metal which must be turned over. Considerable effort is being made for a simpler method of starting turbojet engines.

One of the more commonly used techniques involves the use of an auxiliary engine wherein a motor or a small jet turbine turns over the main turbojet motor. In the interest of simplicity and economy this auxiliary starter turbine is desirably propelled by gas from a gas generating composition. Many gas generating compositions are known, the best of which are the so-called double based propellants which have been so extensively used in military rockets. Other solid propellants well known are the ammonium chlorate compositions or perchlorate compositions utilized in assisted take-off units commonly referred to as ATO units. Double based propellants have the serious drawback of cost and composition of the gas produced. The perchlorate type compositions have the serious drawback of safety and are not useable in gas generators because of the corrosive exhaust products.

A solid propellant for turbojet engine starting service must meet a literal forest of service requirements. Jet planes operate from the Arctic regions to the Equator and thence to the Arctic regions. Surface temperatures over this sweep may range from −70° F. to 140° F. Bases for jet aircraft, military and commercial, will range over this entire region. The gas generating compositions, hereinafter designated as starter cartridges, must be stored, frequently for months and months, at these conditions. Therefore it is essential that the solid propellant used in a gas generator cartridge must be stable in storage from the range of −70° F. to at least +140° F. Thus, the cartridge must not change its dimensional configuration; the cartridge must not develop fissures or cracks; the cartridge must maintain its chemical composition constant in order that the characteristics of the gas produced and the time of the burning may be constant.

It is self-evident that there should be no operational problems with the ignition of the cartridge over this wide range of atmospheric temperatures. Furthermore, the rate at which the gases are generated must be substantially constant regardless of the temperature at which the cartridge is fired.

It is also self-evident that the gas cartridge must be physically strong. It must be able to withstand the handling in going from the point of manufacture thousands of miles by train, truck, ship or aircraft to its final destination. Not only must it withstand rough treatment in its shipping case, it must be capable of withstanding rough handling by the mechanics who place the cartridges into the cartridge receiver of the auxiliary starter. Particularly at very low temperatures men are awkward and it is expected that cold hands will drop cartridges. The cartridge may fall several feet and land on frozen ground. It is necessary that the dropped cartridge can be picked up, inserted into the receiver and function without fail.

In addition to these stringent requirements imposed by the atmospheric conditions and other necessary operational conditions, it is necessary that the cartridges be relatively inexpensive when it is considered that a cartridge will be used every time a turbojet engine is started; it is indeed essential that the cartridge be relatively cheap. Because of this cost consideration, ammonium nitrate is a natural ingredient as the main gas producing component of a gas generating cartridge grain. To compensate for its cheapness, ammonium nitrate introduces a complication with respect to storage stability. Ammonium nitrate crystals undergo phase changes at several temperatures. The most serious of these occur at about 90° F. and at about 0° F.

A further complication with the use of ammonium nitrate is in its extreme combustion stability. It is necessary to utilize a combustion catalyst in order to ignite ammonium nitrate under controlled conditions. The presently known catalysts for ammonium nitrate are metal salts such as chromates and iron compounds which burn to produce solid oxides. These solid oxide particles pass out of the combustion chamber wherein the cartridge is burned and render the gas stream extremely erosive. Since the lift of the auxiliary starter turbine is also a primary consideration in the use of this type of starter, the gas produced by the starter composition must be essentially non-erosive.

A further complication with respect to the use of any solid propellant for this purpose lies in the temperature of the gas stream from the combustion of the starter cartridge. In order to have a relatively economical auxiliary starter it is very desirable that the temperature of the gas stream passing into the auxiliary starter turbine be not more than about 2100° F.

An object of this invention is a solid propellant composition suitable for use in auxiliary starters for turbojet engines. A particular object is an ammonium nitrate based solid propellant suitable for use as a gas generating composition in auxiliary starters for turbojet engines. Other objects become apparent from the description of the invention.

Briefly, the composition of this invention consists on a weight basis of about 6.5% of a partially esterified cellulose acetate having a weight percent acetic acid between about 51% to about 57%; about 7.9% of an acetyl trialkyl citrate containing from 1 to 2 carbon atoms per alkyl radical of said acetyl trialkyl citrate; about 6.9% of a dinitrophenoxyethanol-containing modifier selected from the class consisting of dinitrophenoxyethanol and a mixture consisting essentially of a dinitrophenoxyethanol and a bis(dinitrophenoxy)ethane, said dinitrophenoxyethanol constituting at least 50% by weight of said mixture; about 2.5% of finely divided carbon; about 3.0% of monosodium barbiturate; about 1.4% of propane-insoluble petroleum asphaltic resin and about 1.0% of an aromatic amine, the remainder of said composition consisting essentially of ammonium nitrate; to this above composition may be added small amounts of a surfactant, GR–S latex solids, that is, butadiene-styrene copolymer and a small amount of a resin in the form of p-tertiary-butylphenol-acetylene condensation product.

Cellulose acetate, dinitrophenoxyethanol or dinitrophenoxy-ethanol-bis(dinitrophenoxy)ethane mixture and acetyl trialkyl citrate of the composition serve as the thermoplastic material for binding together the ammonium nitrate particles and other solid components. These binder components provide combustible organic material which is relatively high in combined oxygen content. The binder and other combustible components in admixture with ammonium nitrate provides a balanced stoichiometry with respect to oxygen so that the propellant gas is substantially smokeless.

The cellulose acetate polymer used in this invention is a partially esterified cellulose acetate having a weight percent acetic acid content of between about 51 and 57 weight percent. The term "weight percent acetic acid" denotes the amount of acetic acid obtained on saponification of the cellulose acetate and is expressed as percent of the initial material. We prefer a lacquer grade cellulose acetate having an acetic acid content of 54–56, that is, about 55 weight percent acetic acid. Commercial products of lacquer grade partially esterified cellulose acetate are marketed as containing 54–56 weight percent acetic acid with variation of acetic acid content within this range. The term "about 55 weight percent acetic acid" is used herein to mean this preferred lacquer grade cellulose acetate polymer. The defined cellulose acetate is present in the composition in an amount of about 6.5 percent by weight of the composition.

The acetyl trialkyl citrate plasticizer used in the invention may be any commercial grade acetyl trialkyl citrate containing from 1 to 2 carbon atoms in each alkyl group. Examples are acetyl trimethyl citrate, acetyl triethyl citrate and acetyl methyldiethyl citrate. We prefer the acetyl triethyl citrate. Either the pure materials or commercial grade purity materials may be used. About 7.9% of the acetyl trialkyl citrate is used in the composition.

In addition to the cellulose acetate polymer and the citrate plasticizer the binder of this invention contains a modifier which is either a dinitrophenoxyethanol or a mixture of dinitrophenoxyethanol with bis(dinitrophenoxy)ethane; the mixture contains not more than 50 weight percent of the bis(dinitrophenoxy)ethane constituent. The dinitrophenoxyethanol may be any one of the various isomeric species, such as 2,4-dinitrophenoxyethanol. The mixture, which may be utilized in the composition of the invention, is most commonly obtained as a mixture of primary reaction product and secondary reaction product in the preparation of the dinitrophenoxyethanol. The dinitrophenoxyethanol is the primary reaction product. By control of the reaction conditions utilized in the prior art methods for the preparation of the dinitrophenoxyethanol, the reaction product may contain as little as 10 weight percent of the bis-dinitrophenoxy)ethane secondary reaction product to as much or even more than 50 weight percent. As it is necessary to have a modifier mixture containing not more than 50 weight percent of the secondary reaction product, the total reaction product may have to be purified when it naturally contains more than this amount of the secondary reaction product.

The modifier mixture may be readily prepared by the method taught by Blanksma and Fohr, Rec. trav. chem. 65, 711 (1946) wherein dinitrochlorobenzene is reacted with ethylene glycol utilizing sodium as the condensing agent; or by the method of Fairbourne and Toms, J. Chem. Soc. 119, 2077 (1921) wherein caustic soda is used as the condensing agent. To illustrate: the preferred modifier mixture is prepared by reacting 3.5 mols of ethylene glycol with 1 mol of 2,4-dinitrochlorobenzene at a temperature in the range of about 80° to 95° C. for a contact time of about 4 hours, in the presence of 50% aqueous sodium hydroxide solution; about 1 part by weight of sodium hydroxide is used for each 5 parts of the dinitrochlorobenzene. The solid reaction product is removed from the liquid by filtration, water washed and dried at moderate temperature. Under these conditions the reaction product consists of about 63 weight percent of the primary reaction product, 2,4-dinitrophenoxyethanol and about 37 weight percent of the secondary reaction product, bis(2,4-dinitrophenoxy)ethane. It is to be understood that several methods of analysis are available and it has been found that the composition of the reaction product varies somewhat according to the analytical technique. For example, when utilizing differential solubility procedure the amount of the secondary reaction product is always greater than that found by direct analysis to determine the amount of 2,4-dinitrophenoxyethanol by acetylation, that is, by determination of the hydroxyl number of the mixture.

The primary reaction product dinitrophenoxyethanol can be separated by differential solubility utilizing a boiling mixture of toluene or benzene to contact the reaction product. Relatively pure dinitrophenoxyethanol is recovered from the aromatic solvent by evaporation of the aromatic solvent to a concentrated solution and fractional crystallization of the dinitrophenoxyethanol from this solution.

The modifier is present in the gas generating composition in an amount of about 6.9% by weight.

The individual components of the binder utilized in the composition of the invention have been set out as a weight percent of the total composition using the term "about." It is to be understood that appreciable variation in the relative amount of each binder component present may occur. For example, the cellulose polymer purchased from commercial sources will vary in its characteristics somewhat even when ostensively different purchases have identical acetic acid content. Thus, the viscosity of the polymer is primarily used as a means of detecting this light variation between constant acetic acid content purchases. Also, commercial sources cannot at a reasonable cost supply materials having the identical composition at different times. Different suppliers will invariably have cellulose acetate polymer of slightly different characteristics even though apparently of the same composition. The same considerations will hold true for the citrate plasticizer. Also the characteristics of the defined citrates differ sufficiently so that the use of one citrate rather than another will require some adjustment in the amount of citrate used. The modifier component is obviously subject to rather wide shifts in primary and secondary reaction content when utilizing the mixture. The difficulty in controlling the reaction itself coupled with the variation in analysis due to unavoidable procedural techniques makes it virtually impossible to be certain that the modifier will always have the identical desired composition. The amount of binder components will necessarily vary in order to compensate for variation in quality and quantity of other binder components. Nevertheless, the absolute amount of each binder component present in the total composition will lie close to the defined amount set out above. The over-all variation in any one component will probably be not more than + or −0.5 absolute. To illustrate, the cellulose acetate polymer in one batch of gas generating composition may form as little as 6.0 weight percent of the total composition and in another batch may form as much as 7.0%. However, the normal will result in the composition having close to 6.5 weight percent of cellulose acetate polymer.

The combustion catalyst used in the composition is the monosodium salt of barbituric acid. At the temperatures existing in the starter, sodium oxide is a vapor and is non-erosive. The monosodium salt of barbituric acid may be prepared by treating a slurry of barbituric acid in water or ethyl alcohol with sodium hydroxide at temperatures in the range of 15° to about 75° C. The solution should contain an amount of sodium hydroxide equal to that necessary to form the monosodium salt. Upon completion of the reaction the reaction mixture is filtered and the precipitated sodium salt is separated and is dried.

The amount of monosodium barbiturate catalyst used in the composition is about 3% by weight. This amount may have to be increased by as much as 0.5% absolute or may have to be lowered by as much as 1% owing to variation in the activity of the catalyst from various sources as well as the need for adjustment of the burning rate of the cartridge composition as affected principally by apparently slight changes in the processing of the finished cartridge in order to maintain the desired burning rate. The term "about 3%" as used in the specification and claims is meant to include this permissible change in amount of catalyst present.

Finely divided carbon is present in the composition to promote the burning rate of the composition. The carbon blacks, are characterized by low ash content, usually less than about 0.15%, and by extremely small particle size, over the range of 50 to 5000 A. Either channel blacks or furnace blacks may be used. The so-called bead forms of carbon blacks may be used. Other forms of finely divided carbon of low ash content, that is, less than 5.0% of ash, such as finely divided petroleum coke and amorphous graphite may also be used. We prefer the carbon blacks such as channel blacks or furnace blacks.

About 2.5 weight percent of finely divided carbon is present in the composition. The promotional effect of various carbons is quite often different, even among the channel blacks and furnace blacks. The amount present will vary somewhat with catalyst amount present. In order to maintain the desired burning rate, the amount of carbon present may vary by as much as ±0.5% absolute from 2.5 weight percent.

About 1.4 weight percent of propane-insoluble asphaltic resin is included in our compositions. This asphaltic resin component has a softening point within the range of 130°–180° F. as measured in the "A.S.T.M. Ring and Ball Softening Point Test D36–26" described on page 279 of the 1954 edition of "A.S.T.M. Standards on Bituminous Materials for Highway Construction, Water Proofing and Roofing." The asphaltic resin is further characterized by having a penetration at 77° F. (Penetration Test D5–52 page 254 of the above 1954 A.S.T.M. Standards edition), usually within the range of 45–7, that is, 4.5 mm. to 0.7 mm. The asphaltic resin exhibits a ductility greater than 100 at 77° F. in the Ductility Test D113–34, described on page 201 of the A.S.T.M. Standards edition. The resin is of low asphaltene content and is defined as a propane-insoluble petroleum asphaltic resin having an A.S.T.M. softening point within the range of 130°–180° F. and an A.S.T.M. penetration of 45–7, and an A.S.T.M. ductility greater than 100 at 77° F. The resin is obtained by treating a non-oxidized petroleum residuum, usually 15% to 30% bottoms residuum stock, preferably about 20% bottom stock obtained in the pipestilling of crude petroleum, preferably a Mid-Continent petroleum residuum, with liquid propane. The precipitation is carried out with pressures of 200 to about 500 p.s.i. at temperatures within the range of 100–125° F. and at a propane to residuum volume ratio of 1.5 to about 5 preferably about 2.7. The method of deasphalting of reduced petroleum oils is well known in the art and is described in U.S. Patents Nos. 1,944,491; 1,949,989; 2,041,275; 2,081,473 and others.

This asphaltic resin determines the low temperature ignitability of the composition. Change in catalyst content, carbon content and binder components will have some effect on the ignition characteristics of the composition. To insure low temperature ignitability, the amount of resin may have to be varied from batch to batch of composition. The variation in amount may be on the order of ±0.5% from 1.4%.

About 1% of an aromatic amine inhibitor is present in the composition. Examples of suitable aromatic amines are 2,4-diamino toluene, diphenyl amine, diamino naphthylene, dinaphthylamine, phenyl naphthylamine, diamino toluene isomers of 2,4-diamino toluene and the triamino toluenes. Particularly suitable is 2,4-diamino toluene.

The term "ammonium nitrate" as used in this specification and in the claims is intended to mean substantially pure ammonium nitrate; commercial CP or military grades are suitable. The ammonium nitrate should not contain significant amounts of inorganic material which could contribute solid particles to the hot combustion gas. At least a part of the ammonium nitrate up to about 70% or more, should be finely ground before use, although all of the ammonium nitrate may be finely ground. The unground nitrate is usually in the form of granules which pass through a #14 U.S. Standard sieve and are retained on a #30 U.S. Standard sieve in an amount of about 80%, the remainder being substantially all retained on a #80 U.S. Standard sieve. Substantially all of the finely ground ammonium nitrate should pass through a #80 U.S. Standard sieve, about 70% may be retained on a #120 U.S. Standard sieve and 20% on a #200 U.S. Standard sieve, the remaining 10% being about equally divided between larger and smaller than a #325 U.S. Standard sieve apertures. We prefer ammonium nitrate which has been finely ground.

The remainder of the composition after providing for the binder, catalyst, promoter, resin and amine consists essentially of ammonium nitrate. It may be necessary in special cases to have present minor amounts of other organic materials.

The presence of a small amount of a surfactant in the composition may be helpful in obtaining the desired good coating of the solids with the liquid binder in the mixing operation. We have found sorbitan sesquioleates to be particularly effective. In general not more than about 0.2 weight percent of the surfactant based on the weight of the composition, will be used to obtain the desired degree of coating of the solids with liquid binder.

It has been found that even though the composition has been made utilizing the above proportions and care in processing has been exercised, on occasion a particular batch will not pass the cycling test which is used as a measure of storage stability of the grain at atmospheric temperatures. This difficulty has been traced to improper mixing or failure to mix for sufficient length of time or to the presence of very small amounts of surface moisture on the solid materials. Such grains can be made more completely useable for the purposes of the invention by the addition of up to 0.8 weight percent of the solids of GR-S latex said solids containing butadiene-styrene copolymer. These solids contain the copolymer in an amount of at least about 90 weight percent and usually about 95 weight percent, the non-polymeric material being essentially a soap used as emulsifier in the polymerization process. In addition to the solids from GR-S latex a very small amount of a resin is added as tackifier. This resin is a solid condensation product of acetylene and p-tertiary-butylphenol, said product containing these components in about one to one mol ratio. The amount of the tackifier added to the gas-forming composition is usually about 1 part by weight for every 4 parts by weight of the solids from the latex. When the GR-S latex solids and resin mixture are thoroughly blended with a composition which does not cycle, the resulting composition passes the cycling test. The amount of mixture of solids from the latex in admixture with resin tackifier incorporated in the composition is dependent upon the particular composition being doctored but in general not more than about 0.8% by weight of the latex solids and 0.2% of resin are needed.

A particularly suitable method of preparing test size grains of the compositions of this invention is set out below:

The cellulose acetate and the ammonium nitrate are introduced into a steam-jacketed pot, provided with agitation means. The two materials are stirred at a temperature of about 115° C. to 120° C. for a period of 30 to 40 minutes, at a pressure of about ⅓ atmosphere in order to remove surface moisture. To the dry cellulose acetate-ammonium nitrate mixture is then added the sodium barbituate catalyst, the carbon promoter, the 2,4-diamino toluene, the dinitrophenoxyethanol modifier and the asphaltic resin, and mixing is continued under vacuum at a temperature between about 100° and 120° C., preferably not above 110° C. for a period of about 15 minutes. When the GR–S latex solids and resin, formed by the condensation of p-tertiary-butylphenol with acetylene, are to be included in the composition the latex and resin are thoroughly intermixed with the asphaltic resin and heated to a temperature of about 140° C. to form a dehydrated homogeneous mixture following which the dehydrated mixture is added to the mixture of the other solid components and mixing is continued. Following the mixing of the aforementioned components, the trialkyl citrate plasticizer is added along with the surfactant and the mixing of the composition is continued at a temperature of 110°±5° C. for a period of from 1 to 3 hours.

The binder material may be prepared separately by heating the plasticizer and modifier to a temperature of about 120° C. to about 140° C. and adding the cellulose acetate polymer to the molten material. The binder components are mixed to homogeneity and the ammonium nitrate and other components are added to the molten binder; stirring is continued for several hours at a temperature not in excess of 115° C., preferably at a temperature about 110° C.

Tests have been devised which predict the ability of a particular composition to meet the strength performance requirements for this use. Illustrative examples are set out below of compositions which have undergone this test and which will meet the actual performance requirements.

Burning test strands were prepared by molding the composition at about 2000 pounds pressure and about 110° C. into rectangular strips of about 1 inch by ¾ inch cross-section dimension. These strips were cut into 12 test strips ¼" x ¼" about 5" in length. The strips were provided with holes drilled 3" apart through which fusible wires were connected to a timing device. Burning rates were determined under nitrogen pressure in a bomb. The test strips were coated with lacquer grade cellulose acetate to inhibit surface burning and obtain cigarette-fashion burning. The strands were ignited by a Nichrome wire. Burning rates (inches per second) were determined at bomb pressure of 600 to 1800 pounds per square inch. Burning rates in inches per second for the different pressures are plotted on log-log paper, burning rates being plotted vertically and pressures are plotted horizontally. This plot gives a straight-line relationship wherein the slope of the line is the so-called pressure exponent of the composition. The burning rates are normally defined as rates at 1000 p.s.i.; the requirement is a rate in the range of 0.08"/sec. to 0.12"/sec., with a pressure exponent not more than 0.80 and preferably less than 0.60. The burning rates at 1000 p.s.i. of our compositions are, in general on the order of 0.08 and the pressure exponents are on the order of 0.55.

The cartridge grains were prepared by molding under a pressure of about 1000 to 6000 p.s.i. and at a temperature within the range of from about 105° C. to about 115° C. Cartridge grains are usually in the form of hollow cylinders 3" to 6" in diameter and about 3" to 6" in length, these cylindrical molds being provided with a hole or opening extending lengthwise of the grain to provide an aperture which may be circular, starform, cruciform, etc. The burning of the cartridge grain is restricted to exterior cylindrical surface and interior aperture surface by coating the annular ends of the grain with restrictor material such as cellulose acetate. The cartridge grains mounted in a case, may be ignited or fired by electrical or other known means. The temperature of the combustion gases produced in the cartridge grain is less than the specification maximum of 2100° F.

The specific examples below illustrate the combination of components which are effective as gas-forming cartridge grain compositions suitable for the starting of turbojet engines.

EXAMPLE 1

A gas-forming composition was prepared according to the method of compounding the components as described above. This composition contained commercial lacquer grade partially esterified cellulose acetate having an acetic acid content of about 55 weight percent acetic acid and ammonium nitrate of CP grade, 80% of which was ground in a single pass through a pulverizer at 7500 r.p.m. and 20% being unground. The acetate and nitrate were predried with mixing thereof under vacuum at about 117° C. for a period of 35 minutes following which the "dry" components consisting of dinitrophenoxyethanol, monosodium barbiturate catalyst, carbon black promoter; technical grade 2,4-diamino toluene and propane-insoluble asphaltic resin were added to the mixture and stirring was continued for fifteen minutes under vacuum. The asphaltic resin had an A.S.T.M. softening point of 162° F., an A.S.T.M. penetration at 77° F. of 7 and an A.S.T.M. ductility greater than 100 at 77° F. To the mixture was then added commercial grade acetyl triethyl citrate and mixing was continued at a mixture temperature of 110° C. ±5° C. for a period of one and one-half hours.

The modifier contained 63% by weight of 2,4-dinitrophenoxyethanol and 37% by weight of bis(2,4-dinitrophenoxy)ethane and was prepared as follows:

To a 70 gallon stainless steel kettle, equipped with a motor-operated stirrer and heating coils, was added 109 pounds of ethylene glycol and 102 pounds of technical grade 2,4-dinitrochlorobenzene to give a mol ratio of about 3.5 to 1.0 ethylene glycol to 2,4-dinitrochlorobenzene in the mixture. The stirred mixture was heated to 65° C. and a 50% aqueous solution of sodium hydroxide containing 22.7% pounds of caustic soda was added incrementally over a period of two hours. The heat of reaction was sufficient to maintain the temperature at 80–95° C. without external heating. Following addition of the caustic solution the mixture was stirred for an additional two hours, the temperature being maintained in the 80–95° C. range, after which thirty gallons of water was added slowly. The precipitated solid was filtered and the filter cake was resuspended and washed in forty gallons of water, at a temperature of 60–70° C. and the suspension was filtered hot. The filter cake was washed repeatedly with gallon portions of warm water. Traces of sodium dinitrophenoxide resulting from partial hydrolysis of the 2,4-dinitrochlorobenzene intermediate were removed during the washing operation. The product was air-dried 10 days at ambient temperature.

The monosodium barbiturate catalyst was prepared by suspending a commercial grade of barbituric acid in ethyl alcohol to form a slurry. To this slurry was added sodium hydroxide in an amount to form the monosodium salt of barbituric acid. The exothermic heat of reaction caused the temperature to rise which temperature was controlled not to exceed 75° C. The mixture was filtered following completion of the reaction. The insoluble monosodium barbiturate was washed with ethyl alcohol and dried. The carbon black was a commercial furnace black.

The composition of the gas-forming propellant on a weight percentage basis was:

| | |
|---|---:|
| Ammonium nitrate | 70.2 |
| Cellulose acetate | 6.3 |
| Modifier mixture | 6.9 |
| Acetyl triethyl citrate | 7.9 |
| Propane-insoluble asphaltic resin | 1.7 |
| Monosodium barbiturate | 3.0 |
| Carbon black | 3.0 |
| 2,4-diaminotoluene | 1.0 |

This propellant composition was molded at 4000 p.s.i. and about 110° C. into hollow cylindrical grains having a diameter of 5 inches, a length of 4 inches and provided with a centrally located cylindrical aperture of 1½" diameter. Grains were cycled by heating the grains to 170° F. in an oven over a period of four hours, then cooling the grains to —75° F. in a refrigerator over a period of 4 hours and immediately repeating the high temperature-low temperature cycle. This test caused no change in the physical properties of the cartridges. These were fired successfully following the test. Cartridges stored at a temperature of 170° F. for a period of 30 days showed no development of cracks or other physical damage and were fired successfully following the storage test.

Two additional gas-forming compositions were prepared from the same materials and by the same procedure as the compositoin of Example 1. Grains were prepared by molding the duplicate compositions under the same temperature and pressure conditions as used in molding grains of the above composition. The three series of grains, designated as A, B and C, were fired successively at temperatures of —75° F., +70° F. and +170° F. in a starter motor having a 0.236 diameter nozzle to determine the reproducibility of firing properties and gas-pressure developed by grains obtained from like but separately prepared compositions. The results of firing tests are given in Table I below.

*Table I*

| Grains | Temperature, °F. | Maximum Pressure, Lbs. sq. inch | Average Pressure, Lbs. sq. inch | Temperature Coefficient [1] |
|---|---|---|---|---|
| A | −75 | 1,000 | 850 | 26.1 |
|   | 70  | 1,200 | 1,150 |  |
|   | 170 | 1,350 | 1,300 | 13.1 |
| B | −75 | 725   | 700   | 31.7 |
|   | 70  | 1,200 | 1,025 |  |
|   | 170 | 1,400 | 1,300 | 26.8 |
| C | −75 | 800   | 700   | 30.0 |
|   | 70  | 1,250 | 1,000 |  |
|   | 170 | 1,400 | 1,300 | 30.0 |

[1] The temperature coefficient of pressure is determined by dividing the difference of average over-all pressures developed when firing a grain having a temperature T and the pressure developed by firing a grain of like composition having a temperature of 70° F. by the average pressure developed when the 70° F. grain is fired.

Grains A, B and C prepared from different batches of similar compositions shown uniform firing and burning properties. The results in Table I shown uniformly satisfactory firing of the grains at high, low and ambient temperature and also show satisfactory temperature coefficient, that is, small variation of pressure developed when fired at high or low temperature compared to pressure developed when fired at ambient (70° F.) temperature. The average pressures developed when firing high temperature grains are lower than the 1500 p.s.i. limit for a grain fired at 170° F.

EXAMPLE 2

Another gas-forming propellant composition was prepared according to the above procedure the ammonium nitrate of which consisted of 30% unground nitrate and 70% ground at 7500 r.p.m. in the pulverizer. Samples of all of the same components as used in Example 1 were used and in addition small amounts of sorbitan sesquioleate and butadiene-styrene copolymer in the form of GR–S latex solids and p-tertiary-butylphenol-acetylene condensation product were incorporated in the composition. The propane-insoluble asphaltic resin was premixed with the p-tertiary-butylphenol-acetylene condensation product and sufficient GR–S 2003 latex to provide 0.5% by weight of the dry GR–S solids product to the composition. The latex contained about 60% solids (59%–61% total solid grade) of which solids the non-polymer content was 3 to 4 weight percent. The polymer consisted of 70% butadiene monomer and 30% styrene and in the latex (emulsion) form was of particle size of about 3000 A. The components as propane-insoluble asphalt, GR–S latex and tackifier resin were mixed and heated for a period of several hours at about 140° C. The dehydrated mixture was incorporated in the gas-forming composition described hereinbelow.

The composition on a weight percent basis was:

| | |
|---|---:|
| Ammonium nitrate | 70.0 |
| Cellulose acetate | 6.9 |
| Modifier mixture | 6.8 |
| Acetyl triethyl citrate | 7.4 |
| Propane-insoluble asphaltic resin | 1.1 |
| Monosodium barbiturate | 3.0 |
| Carbon black | 3.0 |
| 2,4-diaminotoluene | 1.0 |
| Solids from GR–S 2003 latex | 0.5 |
| p-Tertiary-butylphenol-acetylene condensation product | 0.1 |
| Sorbitan sesquioleate | 0.2 |

Grains were molded using this composition. In the 170° F. storage test the grains fired successfully after being aged 30 days at 170° F. The aged and unaged grains showed identical burning pressures when fired at room temperature. The grains were cycled in the —75° F. and 170° F. temperature cycles and were fired successfully following this test. Firing results of a series of grains molded at 4000 p.s.i. from this composition and of a series of grains separately prepared from a like composition containing samples of the same components in the same proportion as this composition are given in Table II below. Grains prepared from the above composition are designated as D grains and grains prepared from the duplicate composition are designated as E grains in the table.

*Table II*

| Grain | Temperature, °F. | Maximum Pressure, Lbs. sq. inch | Average Pressure, Lbs. sq. inch | Temperature Coefficient |
|---|---|---|---|---|
| D | −75 | 850   | 800   | 27.3 |
|   | 70  | 1,150 | 1,100 |  |
|   | 170 | 1,450 | 1,350 | 22.7 |
| E | −75 | 1,150 | 1,000 | 16.7 |
|   | 70  | 1,250 | 1,200 |  |
|   | 170 | 1,625 | 1,500 | 25.0 |

As in Table I, the temperature coefficients are relatively low, that is, the effect on pressure development of grain temperature when fired, is small, a characteristic which makes our propellant compositions most suitable for turbojet engine starting. The average gas pressures developed by the D and E series of grains were somewhat higher than the pressures developed by the A, B and C series of grains (Table I), although in no firings was the gas pressure developed above the desired 1500 p.s.i.

The grains prepared with the composition described in Examples 1 and 2 when fired in the test motor exhibited flame temperatures of 2050° F., thus being below the maximum desirable 2100° F. standard. The exhaust combustion gas was substantially smokeless, non-corrosive and non-erosive to turbine blades. The burning rates of the grains, fired at about 70° F. at a burning pressure of 1000 p.s.i. were 0.09"/sec. and the pressure exponents were below 0.6.

Having thus described our invention we claim:

1. A gas-forming composition suitable for the starting of a turbojet engine which consists essentially, on a weight basis, of about 6.5% of a partially esterified cellulose acetate having a weight percent acetic acid between about 51% to about 57% acetic acid; about 7.9% of an acetyl trialkyl citrate plasticizer containing from 1 to 2 carbon atoms per alkyl radical; about 6.9% of a modifier selected from the class consisting of dinitrophenoxyethanol and a mixture consisting essentially of dinitrophenoxyethanol and bis(dinitrophenoxy)ethane the dinitrophenoxyethanol constituting at least 50% by weight of said mixture, about 2.5% of finely divided carbon; about 3% of monosodium barbiturate; about 1.4% of propane-insoluble petroleum asphaltic resin and about 1% of an aromatic hydrocarbon amine and the remainder consisting essentially of ammonium nitrate.

2. The composition of claim 1 wherein the modifier consists of a mixture of about 63% by weight of 2,4-dinitrophenoxyethanol and about 37% by weight of bis(2,4-dinitrophenoxy)ethane.

3. The composition of claim 1 wherein the partially esterified cellulose acetate has a weight percent acetic acid of about 55% acetic acid.

4. The composition of claim 1 wherein the carbon is carbon black.

5. The composition of claim 1 wherein the amine is 2,4-diaminotoluene.

6. The composition of claim 1 wherein the acetyl trialkyl citrate is acetyl triethyl citrate.

7. A gas-generator cartridge grain having the following weight percent composition:

| | |
|---|---|
| Ammonium nitrate | 70.2 |
| Partially esterified cellulose acetate having a weight percent acetic acid content of about 55 weight percent | 6.3 |
| 2,4-dinitrophenoxyethanol - bis(2,4-dinitrophenoxy)ethane mixture consisting of about 63% by weight of 2,4-dinitrophenoxyethanol and about 37% by weight of bis(2,4-dinitrophenoxy)ethane | 6.9 |
| Acetyl triethyl citrate | 7.9 |
| Propane-insoluble petroleum asphaltic resin | 1.7 |
| Monosodium barbiturate | 3.0 |
| Carbon black | 3.0 |
| 2,4-diaminotoluene | 1.0 |

8. The composition of claim 7 wherein about 0.2 weight percent of sorbitan sesquioleate is present.

References Cited in the file of this patent

UNITED STATES PATENTS 2,643,611    Ball ------------------ June 30, 1953

FOREIGN PATENTS 655,585    Great Britain ----------- July 21, 1951